US012739767B2

(12) United States Patent
Hong

(10) Patent No.: US 12,739,767 B2
(45) Date of Patent: Sep. 15, 2026

(54) METHOD AND APPARATUS FOR UPLINK TIMING ADJUSTMENT, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 341 days.

(21) Appl. No.: 18/288,524

(22) PCT Filed: Apr. 27, 2021

(86) PCT No.: PCT/CN2021/090328

§ 371 (c)(1),
(2) Date: Oct. 26, 2023

(87) PCT Pub. No.: WO2022/226803

PCT Pub. Date: Nov. 3, 2022

(65) Prior Publication Data

US 2024/0267863 A1 Aug. 8, 2024

(51) Int. Cl.
*H04W 56/00* (2009.01)
*H04L 5/00* (2006.01)

(52) U.S. Cl.
CPC ....... *H04W 56/0045* (2013.01); *H04L 5/0051* (2013.01)

(58) Field of Classification Search
CPC .. H04W 56/0045; H04W 56/00; H04L 5/0051
See application file for complete search history.

(56) References Cited

U.S. PATENT DOCUMENTS

2008/0002660 A1* 1/2008 Jeong .................. H04L 27/2655 370/350
2013/0201973 A1 8/2013 Ye
(Continued)

FOREIGN PATENT DOCUMENTS

CN 106376075 A * 2/2017 ............ H04W 56/00
CN 110636601 A 12/2019
(Continued)

OTHER PUBLICATIONS

The First Office Action issued in CN Application No. 202180001331.5 dated Aug. 16, 2024 with English translation, (14p).
(Continued)

*Primary Examiner* — Mounir Moutaouakil
(74) *Attorney, Agent, or Firm* — Arch & Lake LLP; Hao Tan; Shen Wang

(57) ABSTRACT

The present disclosure provides a method and apparatus for uplink timing adjustment, and a storage medium. The method is performed by a terminal and includes: acquiring downlink timing information, where the downlink timing information includes a first downlink timing corresponding to a first moment of the terminal and a second downlink timing corresponding to a second moment of the terminal; adjusting, based on a timing difference between the second downlink timing and the first downlink timing, an uplink timing to be within a timing limit threshold range.

12 Claims, 5 Drawing Sheets

(56) References Cited

U.S. PATENT DOCUMENTS

2014/0286219 A1* 9/2014 Siomina ................ H04W 24/10 370/311
2015/0146684 A1* 5/2015 Yang ..................... H04W 52/40 370/331
2015/0245395 A1* 8/2015 Yamazaki ............. H04W 72/23 455/552.1
2019/0159156 A1* 5/2019 Abedini ............ H04W 56/0045
2019/0191399 A1* 6/2019 Islam .................. H04W 56/005
2019/0349077 A1 11/2019 Alasti et al.
2019/0394770 A1 12/2019 Wang et al.
2020/0267609 A1* 8/2020 Ly ..................... H04W 36/0085
2020/0351957 A1 11/2020 Kim
2021/0006328 A1 1/2021 Kim
2021/0105731 A1 4/2021 Lin
2021/0194572 A1 6/2021 Gu

FOREIGN PATENT DOCUMENTS

CN 110876188 A 3/2020
CN 111615186 A 9/2020
CN 112584482 A 3/2021
CN 115336315 A * 11/2022 ............ H04W 24/08
WO 2021058186 A1 4/2021

OTHER PUBLICATIONS

International Search Report of PCT/CN2021/090328 dated Jan. 26, 2022 with English translation, (6p).
Xiaomi, “Discussion on timing requirements for NR NTN”, 3GPP TSG-RAN4 Meeting #98bis-e R4-2104689 E-meeting, Apr. 12-Apr. 20, 2021, (7p).
Moderator (Xiaomi). “Email discussion summary for [98-bis-e][223] NR_NTN_solutions_RRM_2”, R4-2105693, 3GPP TSG-RAN WG4 Meeting # 98-bis-e R4-210XXXX Electronic Meeting, Apr. 12-20, 2021, (31p).
CNOA issued in Application No. 202180001331.5 dated Apr. 27, 2026 with English translation, (24p).
MediaTek Inc., “UE UL timing adjustment due to Rx beam change”, 3GPP TSG-RAN WG4 Meeting #94-e, R4-2000458, Electronic Meeting, Feb. 24-Mar. 6, 2020, (6p).

* cited by examiner

METHOD AND APPARATUS FOR UPLINK TIMING ADJUSTMENT, AND STORAGE MEDIUM

CROSS-REFERENCE

The present application is a U.S. national phase application of International Application No. PCT/CN2021/090328, filed on Apr. 27, 2021, the entire content of which is incorporated herein by reference for all purposes.

TECHNICAL FIELD

The present disclosure relates to a field of communication technology, and more particularly to a method and apparatus for uplink timing adjustment, and storage medium.

BACKGROUND

In the related art, a terminal needs to perform uplink timing adjustment for uplink communication. The terminal acquires downlink timing information by measuring a downlink reference signal (such as Synchronization Signal Block (Synchronization Signal and PBCH block, SSB)), and adjusts an uplink timing for the next uplink communication based on the acquired downlink timing information. In protocol TS38.133, it is defined that the manner for the uplink timing adjustment is a gradual adjustment, and rules for adjusting timing are as follows, where a maximum amount of timing change for each adjustment is $T_q$, a minimum adjustment rate is $T_p$ per second, and a maximum adjustment rate is $T_q$ per 200 ms.

However, Non-terrestrial networks (NTN) are introduced in the new generation of communication technology, for the NTN networks, when the uplink timing of the terminal at a previous moment and the uplink timing of the terminal at a current moment have changed significantly, the gradual adjustment rules specified in the current protocol require a relatively long time to adjust its uplink timing to be within ±Te, where Te is a transmission timing limit requirement. During the adjustment time, the transmission timing of the terminal is not adjusted timely, which may affect transceiver performance of the terminal and cause interference to the uplink transmission of another terminal.

SUMMARY

To overcome the problems existing in the related art, the present disclosure provides a method and an apparatus for uplink timing adjustment, and a storage medium.

According to a first aspect of the embodiments of the present disclosure, a method for uplink timing adjustment is provided, the method is performed by a terminal and includes:

- acquiring downlink timing information, where the downlink timing information includes a first downlink timing corresponding to a first moment of the terminal and a second downlink timing corresponding to a second moment of the terminal; adjusting, based on a timing difference between the second downlink timing and the first downlink timing, an uplink timing to be within a timing limit threshold range.

According to a second aspect of the embodiments of the present disclosure, an apparatus for uplink timing adjustment is provided and includes:

- a processor; a memory for storing executable instructions of the processor;

- where the processor is configured to execute the method for uplink timing adjustment according to the embodiment of first aspect or any one of embodiment of the first aspect.

According to a third aspect of the embodiments of the present disclosure, a non-transitory storage medium is provided, the non-transitory storage medium has instructions stored thereon, when the instructions in the non-transitory storage medium are executed by a processor of a terminal, enables the terminal to perform the method for uplink timing adjustments according to the embodiment of first aspect or any one of embodiment of the first aspect.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

Figure 1:
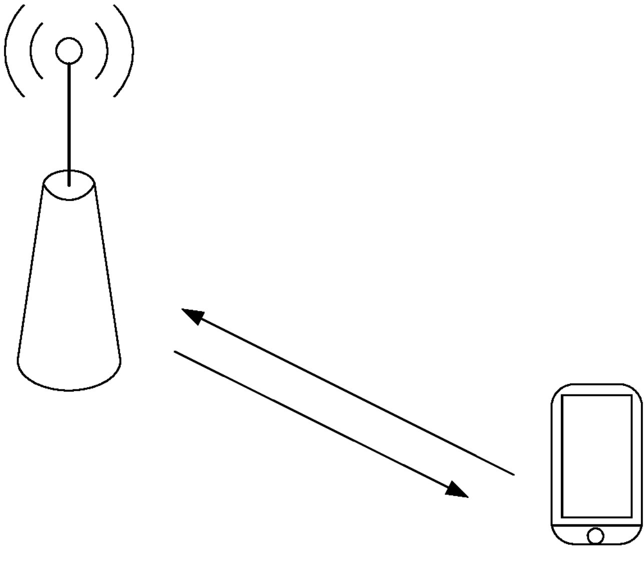
FIG. 1 is a schematic diagram of a wireless communication system according to one or more embodiments of the present disclosure.

The method for uplink timing adjustment provided in embodiments of the present disclosure may be applicable to a wireless communication system in FIG. 1. Referring to FIG. 1, the wireless communication system includes a terminal 10 and a network device 20. Information is sent and received between the terminal 10 and the network device 20 through wireless resources.

It may be understood that the wireless communication system in FIG. 1 is only for schematic illustration. The wireless communication system may also include other network devices, such as a core network device, a wireless relay device, and a wireless backhaul device, which are not illustrated in FIG. 1. Embodiments of the present disclosure do not limit the number of network devices and the number of terminals included in the wireless communication system.

It may be further understood that the wireless communication system in embodiments of the present disclosure is a network that provides wireless communication functions. The wireless communication system may use different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), or carrier sense multiple access with collision avoidance. According to different network capacities, speeds, delays and other factors, the network may be divided into a second generation (2G) network, a third generation (3G) network, a fourth generation (4G) network, or a future evolution network such as a 5G network. The 5G network may also be called a new radio (NR) network. For the convenience of description, the wireless communication network is sometimes referred to as a network for short in the present disclosure.

Further, the network device involved in the present disclosure may also be referred to as a wireless access network device. The wireless access network device may be a base station, an evolved base station (evolved node B, based station), a home base station, an access point (AP) in a wireless fidelity (WIFI) system, a wireless relay node, a wireless backhaul node, a transmission point (TP), a transmission and reception point (TRP), a gNB in an NR system, or a component or part of a device constituting the base station. When it is a vehicle-to-vehicle (V2X) communication system, the network device may also be a vehicle-mounted device. In embodiments of the present disclosure, the specific technology and specific device form adopted by the network device are not limited.

Further, the terminal involved in the present disclosure may also be referred to as a terminal device, a user equipment (UE), a mobile station (MS), a mobile terminal (MT), or the like, which is a device that provides voice and/or data connectivity for a user. For example, the terminal may be a handheld device, a vehicle-mounted device, or the like, with a wireless connection function. At present, some examples of terminals are smart phones, pocket personal computers (PPCs), handheld computers, personal digital assistants (PDAs), notebook computers, tablet computers, wearable devices, vehicle-mounted devices, or the like. In addition, when it is a vehicle-to-vehicle (V2X) communication system, the terminal device may also be a vehicle-mounted device. Embodiments of the present disclosure do not limit the specific technology and specific device form adopted by the terminal.

In the related art, a process of communication between a terminal and a network device includes both uplink and downlink communication processes. The terminal acquires downlink timing information by measuring a downlink reference signal during downlink communication. During uplink communication, the terminal adjusts an uplink timing for the next uplink communication based on the acquired downlink timing information. The uplink timing may also be referred to as an uplink transmission timing. In section 7.1 of a protocol TS38.133, an initial transmission requirement for terminal during the uplink communication is defined, i.e., the terminal acquires the downlink timing information by measuring the downlink reference signal SSB, and adjusts the next uplink timing based on the acquired downlink timing information. The adjustment manner defined in the current protocol is a gradual adjustment. When an uplink timing error exceeds a timing limit threshold range (such as ±Te), the terminal is required to adjust the transmission timing to be within +Te. Rules for adjusting the timing of the terminal are as follows, where:

1. a maximum amount of timing change for each adjustment is $T_q$;
2. a minimum adjustment rate is $T_p$ per second
3. a maximum adjustment rate is $T_q$ per 200 ms where the $T_q$ and $T_p$ are pre-configured values.

The method for uplink timing adjustment mentioned above is mainly applicable to terrestrial networks (TN) networks. However, with the development of communication technology, NTN networks have been introduced. The network characteristic of the NTN networks is satellite based communication. In a NTN scenario, due to an error value of the terminal calculation Timing Advance (TA) and a round trip transmission delay (Round Trip Time, RTT) variation value, the uplink timing error of the terminal may exceed the defined transmission timing limit requirement (Te). When the uplink timing of the terminal at a previous moment and the uplink timing of the terminal at a current moment have changed significantly, according to the gradual adjustment rules specified in the current protocol, the uplink timing adjustment is performed to adjust the uplink timing to be within Te, in this case, it takes a relatively long time to adjust its uplink timing to be within Te. In addition, during the adjustment time, the untimely adjustment for the transmission timing of the terminal may affect transceiver performance of the terminal and cause interference to the uplink transmission of another terminal. Thus, it is necessary to optimize the rules for adjusting the uplink timing of the terminal, in order to solve the problem described above.

The embodiments of the present disclosure provide a method for uplink timing adjustment, where the terminal adjusts the uplink timing to be within a timing limit threshold range based on a timing difference between downlink timings at different moments. The method for uplink timing adjustment provided in the embodiments of the present disclosure, compared to adjusting the uplink timing to be within the timing limit threshold range according to a single downlink timing, may adjust the uplink timing timely when the uplink timing changes significantly at different moments, so as to avoid affecting the transceiver performance of the terminal and avoid the interference to the uplink transmission of another terminal.

For the convenience of description, in the embodiments of the present disclosure, taking different moments at which the terminal acquires the downlink timing at least includes a first moment and a second moment as an example, where the first moment and the second moment are different moments.

Figure 2:
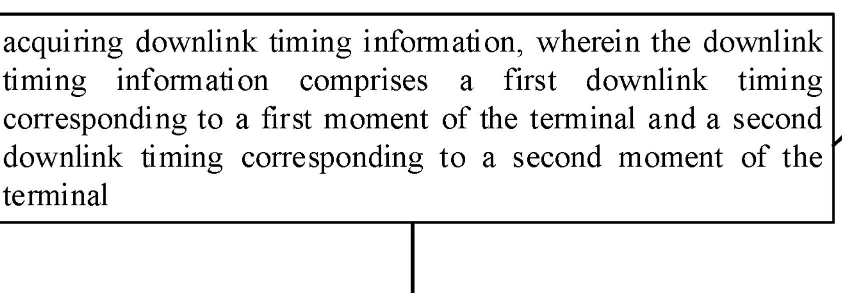
FIG. 2 is a flowchart of a method for uplink timing adjustment according to one or more embodiments of the present disclosure.

FIG. 2 is a flowchart of a method for uplink timing adjustment according to one or more embodiments of the present disclosure, as shown in FIG. 2, the method for uplink timing adjustment is performed by a terminal, includes the following steps S11 and S12.

in step S11, downlink timing information is acquired.

where the downlink timing information includes a first downlink timing corresponding to a first moment of the terminal and a second downlink timing corresponding to a second moment of the terminal.

In the method for uplink timing adjustment provided in the embodiments of the present disclosure, the terminal may acquire the downlink timing information by measuring the downlink reference signal. For example, the terminal determines the downlink timing information by measuring a SSB or a Channel State Information Reference Signal (CSI-RS).

In step S12, based on a timing difference between the second downlink timing and the first downlink timing, an uplink timing is adjusted to be within a timing limit threshold range.

In the method for uplink timing adjustment provided in the embodiments of the present disclosure, the terminal adjusts the uplink timing to be within the timing limit threshold range based on the timing difference between the first downlink timing corresponding to the first moment and the second downlink timing corresponding to the second moment. Compared to adjusting the uplink timing to be within the timing limit threshold range according to a single downlink timing, the terminal may adjust the uplink timing timely when the uplink timing changes significantly at different moments, so as to avoid affecting the transceiver performance of the terminal and avoid the interference to the uplink transmission of another terminal.

The timing limit threshold range involved in the method for uplink timing adjustment provided in the embodiments of the present disclosure may be set to ±Te, where Te may be determined based on a timing evaluation error value of the downlink reference signal and a timing advance evaluation error value.

Figure 3:
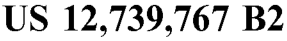
FIG. 3 is a flowchart of a method for determining a timing limit threshold range according to one or more embodiments of the present disclosure.
Figure 3:
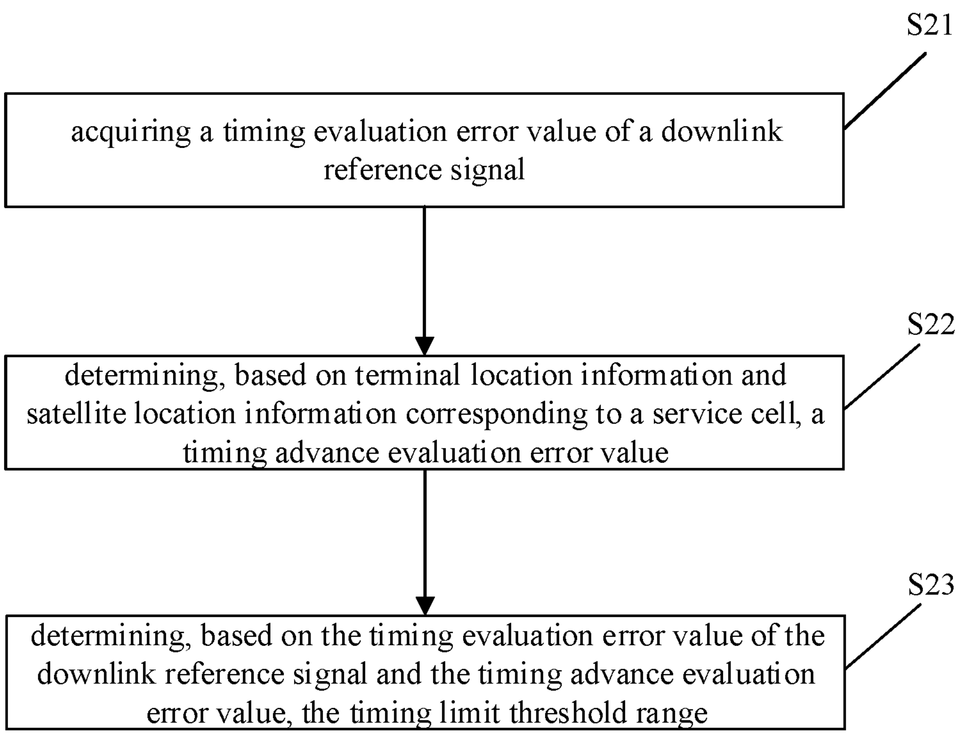

FIG. 3 is a flowchart of a method for determining a timing limit threshold range according to one or more embodiments of the present disclosure, as shown in FIG. 3. The method for uplink timing adjustment is performed by a terminal, and includes the following steps S21 to S23.

In step S21, a timing evaluation error value of a downlink reference signal is acquired.

In the method for uplink timing adjustment provided in the embodiments of the present disclosure, the terminal may determine a timing advance value through the following formula:

$$T_{TA}=(N_{TA}+N_{TA,UE\text{-}specific}+N_{TA,common}+N_{TA,offset})\times T_c$$

where $N_{TA,common}$ is Timing Advance (TA) configured for the network and indicates a transmission delay value of a backup link (feeder link). $N_{TA}+N_{TA,offset}$ is a timing advance value defined in the current protocol. $N_{TA,UE\text{-}specific}$ is a TA value evaluated by the terminal (a timing advance evaluation value). Configuration information of the timing advance may be acquired through a manner of System Information Block (SIB) information/a Radio Resource Control (RRC) message.

the terminal calculates the TA value based on location information of the terminal and location information of a satellite as $N_{TA,UE\text{-}specific}$, which represents the transmission delay value of a service link.

The terminal acquires the location information of terminal through Global Navigation Satellite System (GNSS) positioning, and the terminal receives the location information (ephemeris information or PVT information) of a satellite corresponding to a base station of a service cell. The location information may be acquired through the manner of the SIB information/the RRC message/a Medium Access Control (MAC) message, and the terminal calculates the TA value based on its own location information and the location information of the satellite corresponding to the service cell.

The terminal calculates, based on the terminal location information and the satellite position information corresponding to the service cell, the $N_{TA,UE\text{-}specific}$ value, and a TA error value is generated due to a positioning error. Thus, in the embodiments of the present disclosure, a TA evaluation error value needs to be considered when the Te is determined.

In step S22, based on terminal location information and satellite location information corresponding to a service cell, a timing advance evaluation error value is determined.

In step S23, based on the timing evaluation error value of the downlink reference signal and the timing advance evaluation error value, the timing limit threshold range is determined.

In the method for uplink timing adjustment provided in the embodiments of the present disclosure, based on the timing evaluation error value of the downlink reference signal and the timing advance evaluation error value, the timing limit threshold range is determined, so as to provide a more accurate timing limit threshold range.

In the method for uplink timing adjustment provided in the embodiments of the present disclosure, based on the timing difference between the second downlink timing and the first downlink timing, the uplink timing is adjusted to be within the timing limit threshold range. On the one hand, the one shot adjustment manner may be adopted to adjust the uplink timing to be within the timing limit threshold range, and the one shot adjustment manner of adjusting the uplink timing to be within the timing limit threshold range may also be referred to as one shot adjustment. On the other hand, a cumulative adjustment manner may also be adopted to adjust the uplink timing to be within the timing limit threshold range, and the cumulative adjustment manner may also be understood as a gradual adjustment manner, or be referred to as a gradual adjustment.

In one or more embodiments of the method for uplink timing adjustment provided in the embodiments of the present disclosure, a timing threshold value may be set, and a subsequent uplink timing and adjustment manner performed is determined based on the timing difference between the second downlink timing and the first downlink timing, as well as the timing threshold value. The timing threshold value is greater than a maximum timing limit threshold corresponding to the timing limit threshold range. For example, in response to determining that the timing difference between the second downlink timing and the first downlink timing is greater than the timing threshold value, a one shot adjustment manner is adopted to adjust the uplink timing to be within the timing limit threshold range.

Figure 4:
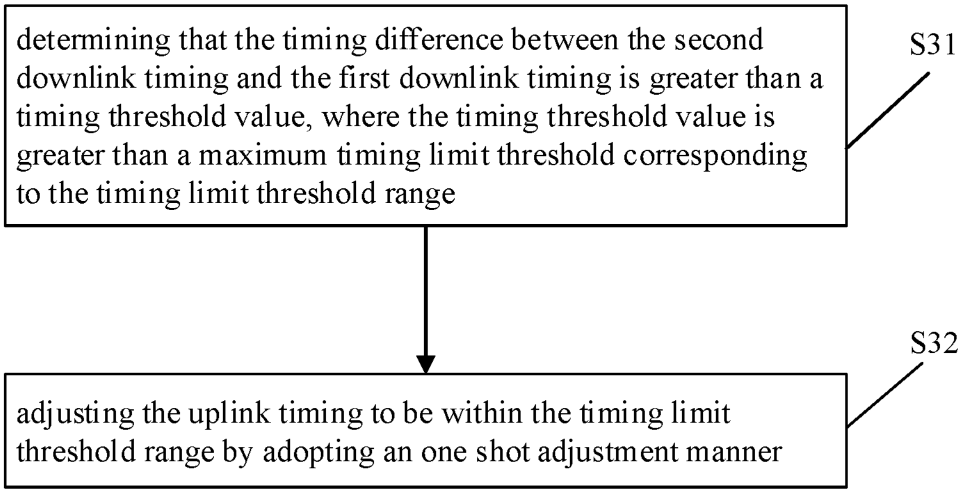
FIG. 4 is a flowchart of a method for uplink timing adjustment according to one or more embodiments of the present disclosure.

FIG. 4 is a flowchart of a method for uplink timing adjustment according to one or more embodiments of the present disclosure, as shown in FIG. 4, and the method for uplink timing adjustment is performed by a terminal, and includes the following steps S31 and S32.

In step S31, it is determined that the timing difference between the second downlink timing and the first downlink timing is greater than a timing threshold value.

the timing threshold value is greater than a maximum timing limit threshold corresponding to the timing limit threshold range.

In step S32, the uplink timing is adjusted to be within the timing limit threshold range by adopting a one shot adjustment manner.

In an example of the method for uplink timing adjustment provided in the embodiments of the present disclosure, it is assumed that the first moment is t1, the first downlink timing corresponding to the first moment is T1, the second moment is t+1, and the second downlink timing corresponding to the second moment is T2. The timing difference between the second downlink timing and the first downlink timing is ΔT=T2−T1. The timing threshold value is H, and the timing limit threshold range is ±Te, where H is greater than the maximum timing limit threshold +Te. When the timing difference (ΔT=T2−T1) between the second downlink timing and the first downlink timing exceeds the timing threshold value H, the terminal adjusts the uplink timing to be within the timing limit threshold range ±Te according to the one shot adjustment manner.

In another embodiment of the method for uplink timing adjustment provided in the embodiments of the present disclosure, in response to the timing difference between the second downlink timing and the first downlink timing being greater than a maximum timing limit threshold and less than a timing threshold value, a gradual adjustment manner is adopted to adjust the uplink timing to be within the timing limit threshold range.

Figure 5:
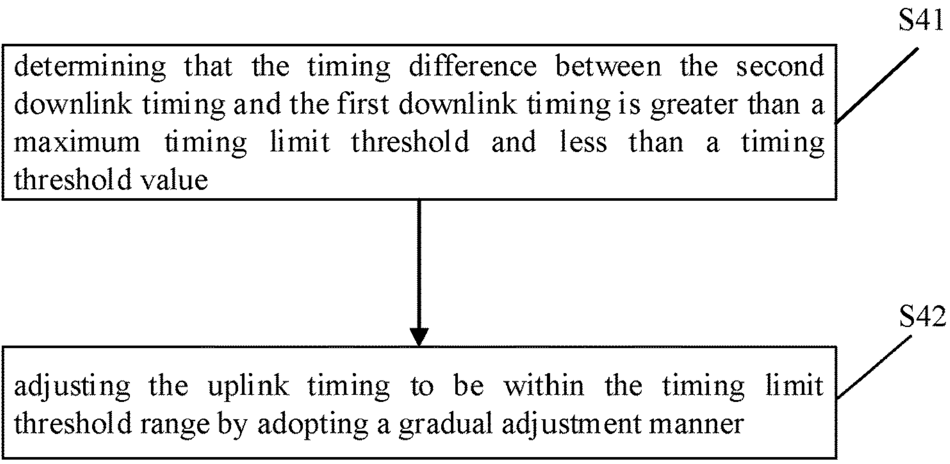
FIG. 5 is a flowchart of a method for uplink timing adjustment according to one or more embodiments of the present disclosure.

FIG. 5 is a flowchart of a method for uplink timing adjustment according to one or more embodiments of the present disclosure, as shown in FIG. 5, and the method for uplink timing adjustment is performed by a terminal, and includes the following steps S41 and S42.

In step S41, it is determined that the timing difference between the second downlink timing and the first downlink timing is greater than a maximum timing limit threshold and less than a timing threshold value.

the timing threshold value is greater than the maximum timing limit threshold corresponding to the timing limit threshold range.

In step S42, the uplink timing is adjusted to be within the timing limit threshold range by adopting a gradual adjustment manner.

In an example of the method for uplink timing adjustment provided in the embodiments of the present disclosure, it is assumed that the first moment is t1, the first downlink timing corresponding to the first moment is T1, the second moment is t+1, and the second downlink timing corresponding to the second moment is T2. The timing difference between the second downlink timing and the first downlink timing is ΔT=T2−T1. The timing threshold value is H, and the timing limit threshold range is ±Te, where H is greater than the maximum timing limit threshold +Te. When the timing difference (ΔT=T2−T1) between the second downlink timing and the first downlink timing exceeds Te but does not exceed the timing threshold value H, the terminal adjusts the uplink timing to be within the timing limit threshold range ±Te according to the gradual adjustment manner.

The method for uplink timing adjustment provided in the embodiments of the present disclosure adopts the gradual adjustment manner to adjust the uplink timing to be within the timing limit threshold range. The terminal may determine a maximum amount of timing change, a minimum adjustment rate, and a maximum adjustment rate for each adjustment based on satellite type indication information; based on the maximum amount of timing change, the minimum adjustment rate, and the maximum adjustment rate for each adjustment, the uplink timing is gradually adjusted to be within the timing limit threshold range.

Figure 6:
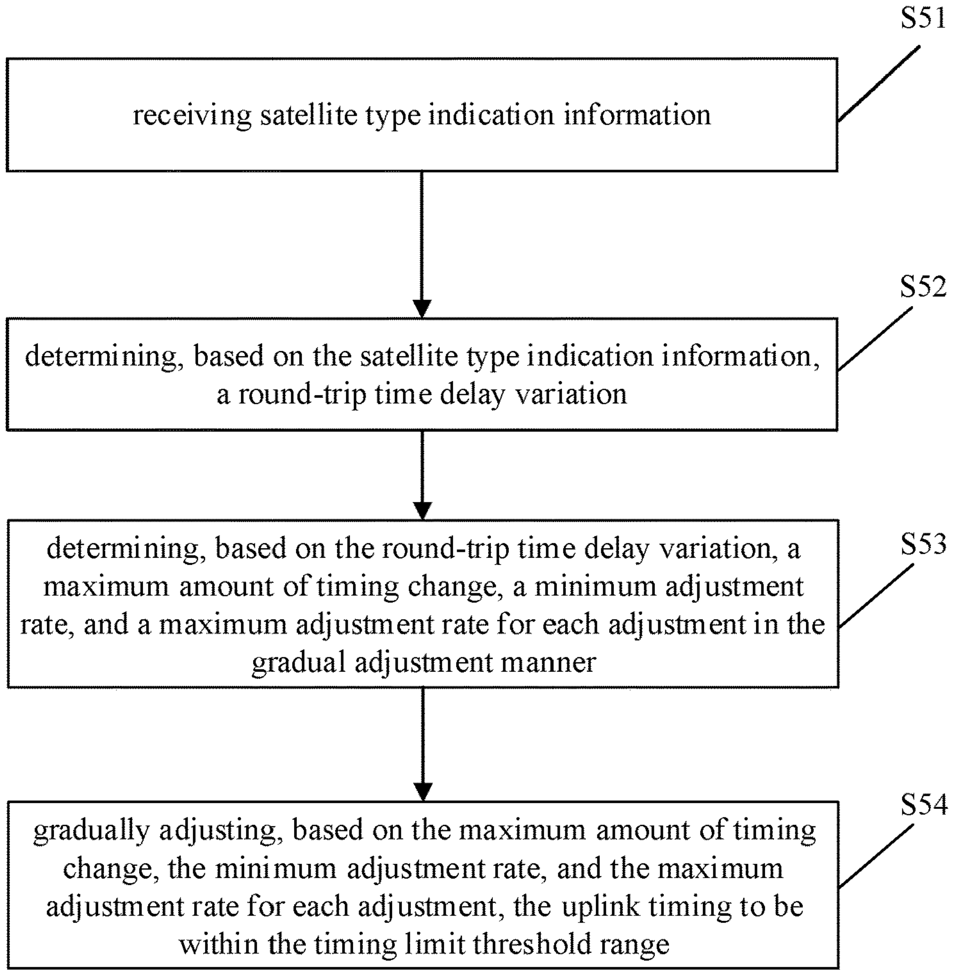
FIG. 6 is a flowchart of a method for uplink timing adjustment according to one or more embodiments of the present disclosure.

FIG. 6 is a flowchart of a method for uplink timing adjustment according to one or more embodiments of the present disclosure, as shown in FIG. 6, and the method for uplink timing adjustment is performed by a terminal, and includes the following steps S51 to S54.

In step S51, satellite type indication information is received.

In the embodiments of the present disclosure, the satellite type indication information may be received through the manner of the System Information Block (SIB) information/the Radio Resource Control (RRC) message.

The satellite type indication information is used to indicate a satellite type. The satellite type information involved in the method for uplink timing adjustment provided in the embodiments of the present disclosure may be Low-Earth Orbit (LEO), Medium-Earth Orbit (MEO), Geostationary-Earth Orbit (GEO), and Unmanned Aircraft System (UAS), where UAS includes High Altitude Platform Station (HAPS) or HEO.

In step S52, a round-trip time (RTT) delay variation (RTT delay variation) is determined based on the satellite type indication information.

In the embodiments of the present disclosure, the satellite type indication information received by the terminal is applicable to different timing adjustment requirements. The timing adjustment requirements include a transmission timing error requirement and a timing advance adjustment accuracy requirement. For example, if the satellite type is GEO or UAS, there is not necessary to consider the RTT transmission delay variation, and the terminal should apply a set of relatively strict timing adjustment requirements. If the satellite type is LEO, MEO, or HEO, it is necessary to consider the RTT transmission delay variation, and the terminal should apply a relatively relaxed set of timing adjustment requirements.

In step S53, based on the round-trip time delay variation, a maximum amount of timing change, a minimum adjustment rate, and a maximum adjustment rate for each adjustment in the gradual adjustment manner are determined.

In step S54, based on the maximum amount of timing change, the minimum adjustment rate, and the maximum adjustment rate for each adjustment, the uplink timing is gradually adjusted to be within the timing limit threshold range.

In the embodiments of the present disclosure, it is assumed that the maximum amount of timing change for each adjustment is x1, the minimum adjustment rate is y1, and the maximum adjustment rate is z1 per T milliseconds. When the gradual adjustment manner is adopted to gradually adjust the uplink timing to the timing limit threshold range, the following rules need to be met:

1. the maximum amount of timing change for each adjustment is x1;
2. the minimum adjustment rate is y1 per second;
3. the maximum adjustment rate is z1 per T milliseconds.

It may be understood that x1 may be different from $T_q$ in the conventional art, and y1 may be different from $T_p$ in the conventional art, and z1 may be different from $T_q$ in the conventional art when T takes a value of 200 milliseconds.

Of course, x1, y1, and z1 may also be the same values as those involved in a gradual adjustment process performed in the conventional art, which is not limited in the embodiments of the present disclosure.

It may be understood that in the method for uplink timing adjustment provided in the embodiments of the present disclosure, in response to the timing difference between the second downlink timing and the first downlink timing not exceeding the timing limit threshold range, the terminal may not perform the uplink timing adjustment.

Figure 7:
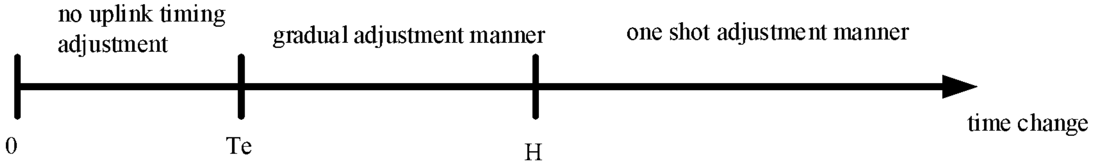
FIG. 7 is a schematic diagram of a process for uplink timing adjustment according to one or more embodiments of the present disclosure.

FIG. 7 is a schematic diagram of a process for uplink timing adjustment according to one or more embodiments of the present disclosure. As shown in FIG. 7, it is assumed that the first moment is t1, the first downlink timing corresponding to the first moment is T1, the second moment is t+1, and the second downlink timing corresponding to the second moment is T2. The timing difference between the second downlink timing and the first downlink timing is $\Delta T=T2-T1$. The timing threshold value is H, and the timing limit threshold range is +Te, where H is greater than the maximum timing limit threshold +Te. When the timing difference ($\Delta T=T2-T1$) between the second downlink timing and the first downlink timing exceeds the timing threshold value H, the terminal adjusts the uplink timing to be within the timing limit threshold range ±Te according to the one shot adjustment manner. When the timing difference ($\Delta T=T2-T1$) between the second downlink timing and the first downlink timing exceeds Te but does not exceed the timing threshold value H, the terminal adjusts the uplink timing to be within the timing limit threshold range ±Te by adopting the gradual adjustment manner. When the timing difference ($\Delta T=T2-T1$) between the second downlink timing and the first downlink timing does not exceed Te, the uplink timing adjustment is not performed.

The method for uplink timing adjustment provided in the embodiments of the present disclosure may effectively solve the problem that in the NTN system, the uplink timing error of the terminal may exceed the defined transmission timing limit requirement (Te) due to the error value of TA calculated by the terminal and the RTT transmission delay variation value. The uplink timing of the terminal may determine, according to different threshold values, whether to perform the gradual timing adjustment or the one shot adjustment, so as to avoid an impact on the transceiver performance of UE caused by untimely timing adjustment and avoid interference on the uplink transmission of another terminal.

It should be noted that those skilled in the art may understand that various embodiments involved in the embodiments of the present disclosure may be used in conjunction with the aforementioned embodiments, and may also be used independently. Whether the embodiments are used alone or in cooperation with the aforementioned embodiments, the implementation principle is similar. In the embodiments of the present disclosure, some embodiments are described in a way that the embodiments are used together. Those skilled in the art may understand that such an example is not limited to the embodiments of the present disclosure.

Based on the same concept, an apparatus for uplink timing adjustment is further provided in the embodiment of the present disclosure.

It may be understood that in order to realize the aforementioned functions, the apparatus for uplink timing adjustment provided in the embodiment of the present disclosure includes a hardware structure and/or a software module for executing each function. Combined with the units and algorithm steps of the examples disclosed in the embodiments of the present disclosure, the embodiments of the present disclosure may be implemented in the form of hardware or a combination of hardware and computer software. Whether a function is executed by hardware or computer software driven by hardware depends on the specific application and design constraints of the technical solution. Those skilled in the art may adopt different methods for each specific application to implement the described functions, but such implementation should not be considered as beyond the scope of the technical solutions of embodiments of the present disclosure.

Figure 8:
FIG. 8 is a block diagram of an apparatus for uplink timing adjustment according to one or more embodiments of the present disclosure.
Figure 8:
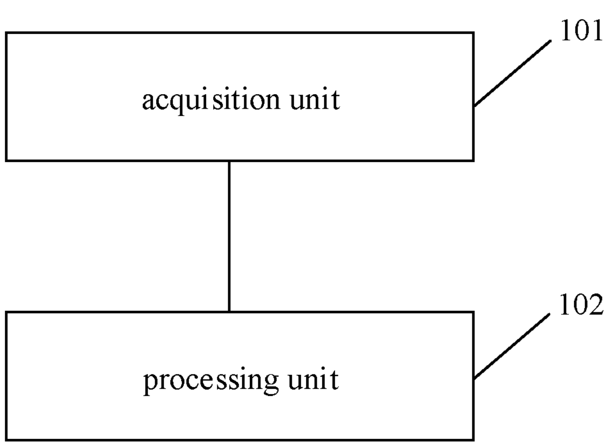

FIG. 8 is a block diagram of an apparatus for uplink timing adjustment according to one or more embodiments of the present disclosure. Referring to FIG. 8, the apparatus for uplink timing adjustment 100 is applied to the terminal, and includes an acquisition unit 101 and a processing unit 102. The acquisition unit 101 is configured to acquire downlink timing information, where the downlink timing information includes a first downlink timing corresponding to a first moment of the terminal and a second downlink timing corresponding to a second moment of the terminal. The processing unit 102 is configured to adjust an uplink timing to be within a timing limit threshold range based on a timing difference between the second downlink timing and the first downlink timing.

In one or more embodiments of the present disclosure, in response to the timing difference between the second downlink timing and the first downlink timing being greater than a timing threshold value, the processing unit 102 adopts a one shot adjustment manner to adjust the uplink timing to be within the timing limit threshold range; where the timing threshold value is greater than a maximum timing limit threshold of the timing limit threshold range.

In one or more embodiments of the present disclosure, in response to the timing difference between the second downlink timing and the first downlink timing being greater than a maximum timing limit threshold and less than a timing threshold value, the processing unit 102 adopts a gradual adjustment manner to adjust the uplink timing to be within the timing limit threshold range.

In one or more embodiments of the present disclosure, the processing unit 102 adopts the gradual adjustment manner as follows to adjust the uplink timing to be within the timing limit threshold range, where the processing unit is configured to:

receive satellite type indication information; determine, based on the satellite type indication information, a round-trip time delay variation, and determine, based on the round-trip time delay variation, a maximum amount of timing change, a minimum adjustment rate, and a maximum adjustment rate for each adjustment in the gradual adjustment manner; gradually adjust, based on the maximum amount of timing change, the minimum adjustment rate, and the maximum adjustment rate for each adjustment, the uplink timing to be within the timing limit threshold range.

In one or more embodiments of the present disclosure, the acquisition unit 101 is further configured to acquire a timing evaluation error value of a downlink reference signal.

the processing unit 102 is further configured to determine, based on terminal location information and satellite location information corresponding to a service cell, a timing advance evaluation error value; determine, based on the timing evaluation error value of the downlink reference signal and the timing advance evaluation error value, the timing limit threshold range.

With regard to the apparatus in the above embodiments of the disclosure, the specific operation modes of various modules have been described in detail in the method embodiments, which are not elaborated here.

Figure 9:
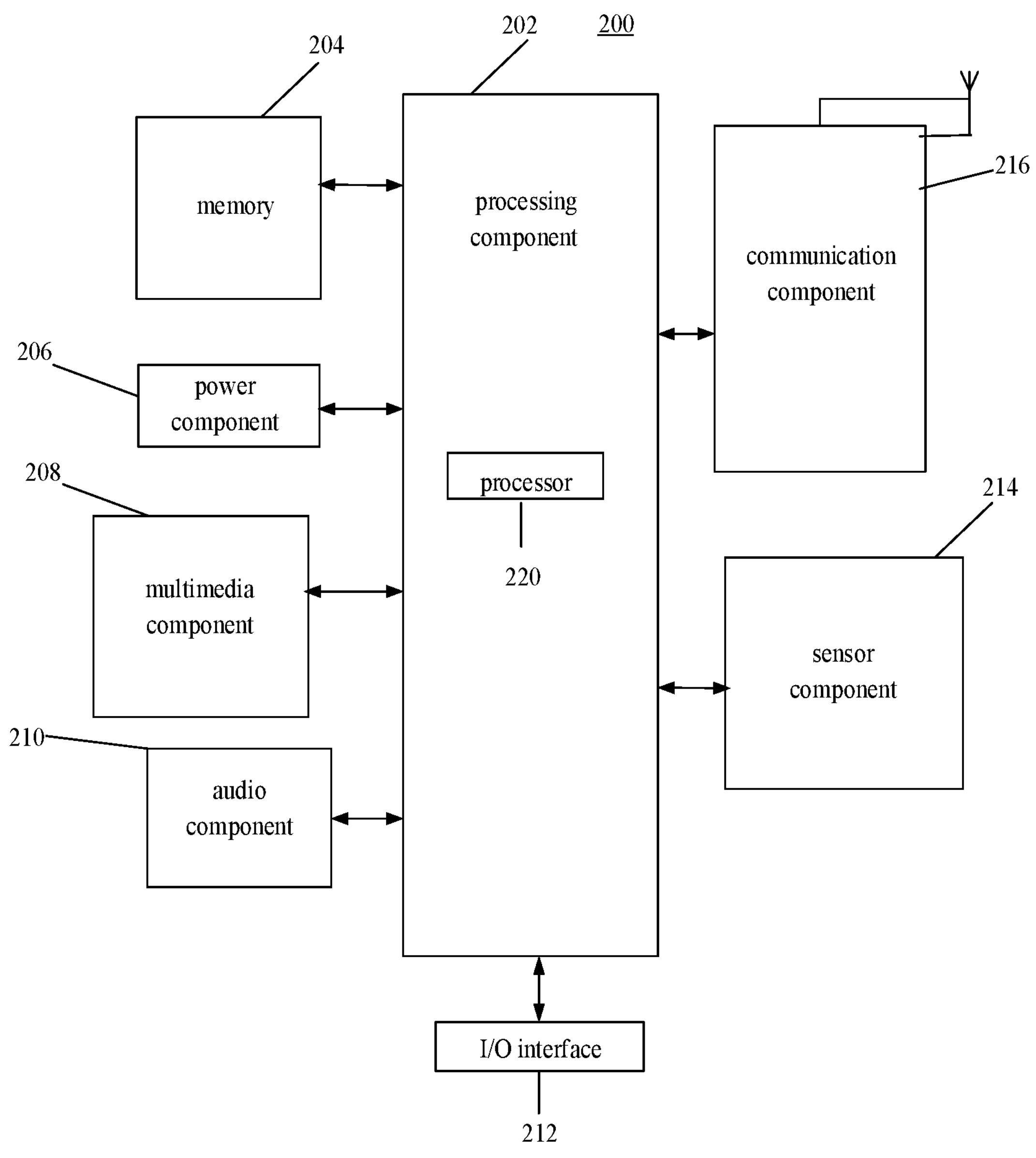
FIG. 9 is a block diagram of an apparatus for uplink timing adjustment according to one or more embodiments of the present disclosure.

FIG. 9 is a block diagram illustrating an apparatus 200 for uplink timing adjustment according to one or more embodiments of the present disclosure. For example, the apparatus 200 may be a mobile phone, a computer, a digital broadcast terminal, a messaging device, a gaming console, a tablet, a medical device, exercise equipment, a personal digital assistant, and the like.

Referring to FIG. 9, the apparatus 200 may include one or more of the following components: a processing component 202, a memory 204, a power component 206, a multimedia component 208, an audio component 210, an input/output (I/O) interface 212, a sensor component 214 and a communication component 216.

The processing component 202 typically controls overall operations of the apparatus 200, such as the operations associated with display, telephone calls, data communications, camera operations, and recording operations. The processing component 202 may include one or more processors 220 to execute instructions so as to perform all or a part of the steps in the above described methods. Moreover, the processing component 202 may include one or more modules which facilitate the interaction between the processing component 202 and other components. For instance, the processing component 202 may include a multimedia module to facilitate the interaction between the multimedia component 208 and the processing component 202.

The memory 204 is configured to store various types of data to support the operation of the apparatus 200. Examples of such data include instructions for any applications or methods operated on the apparatus 200, contact data, phonebook data, messages, pictures, videos, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 is configured to provide power to various components of the apparatus 200. The power component 206 may include a power management system, one or more power sources, and other components associated with the generation, control, and distribution of power in the apparatus 200.

The multimedia component 208 includes a screen configured to provide an output interface between the apparatus 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front camera and/or a rear camera. The front camera and the rear camera may receive an external multimedia datum when the apparatus 200 is in an operation mode such as a photographing mode or a video mode. Each of the front camera and the rear camera may be a fixed optical lens system or have focus and optical zoom capability.

The audio component 210 is configured to output and/or input audio signals. For example, the audio component 210 includes a microphone ("MIC") configured to receive an external audio signal when the apparatus 200 is in an operation mode, such as a call mode, a recording mode, and a voice recognition mode. The received audio signal may be further stored in the memory 204 or transmitted via the communication component 216. In some embodiments, the audio component 210 further includes a loud speaker to output audio signals.

The I/O interface 212 is configured to provide an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the apparatus 200. For instance, the sensor component 214 may detect an on/off status of the apparatus 200, relative positioning of components (e.g., a display screen and a keypad) of the apparatus 200. The sensor component 214 may further detect a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may further include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate a wired or wireless communication between the apparatus 200 and other terminals. The apparatus 200 may access a wireless network based on a communication standard, such as Wi-Fi, 2G, or 3G, or a combination thereof. In one embodiment, the communication component 216 receives a broadcast signal or broadcast associated information from an external broadcast control system via a broadcast channel. In one embodiment, the communication component 216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In embodiments, the apparatus 200 may be implemented with one or more electronic elements such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is further provided a non-transitory computer readable storage medium including instructions, such as the memory 204 including instructions executable by the processor 220 in the apparatus 200 to perform the above-described methods. For example, the non-transitory computer-readable storage medium may be a ROM, a RAM, a CDROM, a magnetic tape, a floppy disc, an optical data storage device, and the like.

According to a first aspect of the embodiments of the present disclosure, a method for uplink timing adjustment is provided, the method is performed by a terminal and includes:

acquiring downlink timing information, where the downlink timing information includes a first downlink timing corresponding to a first moment of the terminal and a second downlink timing corresponding to a second moment of the terminal; adjusting, based on a timing difference between the second downlink timing and the first downlink timing, an uplink timing to be within a timing limit threshold range.

In one or more embodiments of the present disclosure, the adjusting, based on the timing difference between the second downlink timing and the first downlink timing, the uplink timing to be within the timing limit threshold range includes:

adjusting, in response to the timing difference between the second downlink timing and the first downlink timing being greater than a timing threshold value, the uplink timing to be within the timing limit threshold range by adopting a one shot adjustment manner; where the timing threshold value is greater than a maximum timing limit threshold of the timing limit threshold range.

In one or more embodiments of the present disclosure, the adjusting, based on the timing difference between the second downlink timing and the first downlink timing, the uplink timing to be within the timing limit threshold range includes:

- adjusting, in response to the timing difference between the second downlink timing and the first downlink timing being greater than a maximum timing limit threshold and less than a timing threshold value, the uplink timing to be within the timing limit threshold range by adopting a gradual adjustment manner.

In one or more embodiments of the present disclosure, the adjusting the uplink timing to be within the timing limit threshold range by adopting the gradual adjustment manner includes:

- receiving satellite type indication information; determining, based on the satellite type indication information, a round-trip time delay variation, and determining, based on the round-trip time delay variation, a maximum amount of timing change, a minimum adjustment rate, and a maximum adjustment rate for each adjustment in the gradual adjustment manner; gradually adjusting, based on the maximum amount of timing change, the minimum adjustment rate, and the maximum adjustment rate for each adjustment, the uplink timing to be within the timing limit threshold range.

In one or more embodiments of the present disclosure, the method for uplink timing adjustment further includes:

- acquiring a timing evaluation error value of a downlink reference signal; determining, based on terminal location information and satellite location information corresponding to a service cell, a timing advance evaluation error value; determining, based on the timing evaluation error value of the downlink reference signal and the timing advance evaluation error value, the timing limit threshold range.

According to a second aspect of the embodiments of the present disclosure, an apparatus for uplink timing adjustment is provided, the apparatus is applied to a terminal and includes:

- an acquisition unit, configured to acquire downlink timing information, where the downlink timing information includes a first downlink timing corresponding to a first moment of the terminal and a second downlink timing corresponding to a second moment of the terminal; a processing unit configured to adjust, based on a timing difference between the second downlink timing and the first downlink timing, an uplink timing to be within a timing limit threshold range.

In one or more embodiments of the present disclosure, in response to the timing difference between the second downlink timing and the first downlink timing being greater than a timing threshold value, the processing unit adopts a one shot adjustment manner to adjust the uplink timing to be within the timing limit threshold range; where the timing threshold value is greater than a maximum timing limit threshold of the timing limit threshold range.

In one or more embodiments of the present disclosure, in response to the timing difference between the second downlink timing and the first downlink timing being greater than a maximum timing limit threshold and less than a timing threshold value, the processing unit adopts a gradual adjustment manner to adjust the uplink timing to be within the timing limit threshold range.

In one or more embodiments of the present disclosure, the processing unit adopts the gradual adjustment manner as follows to adjust the uplink timing to be within the timing limit threshold range, where the processing unit is configured to:

- receive satellite type indication information; determine, based on the satellite type indication information, a round-trip time delay variation, and determine, based on the round-trip time delay variation, a maximum amount of timing change, a minimum adjustment rate, and a maximum adjustment rate for each adjustment in the gradual adjustment manner; gradually adjust, based on the maximum amount of timing change, the minimum adjustment rate, and the maximum adjustment rate for each adjustment, the uplink timing to be within the timing limit threshold range.

In one or more embodiments of the present disclosure, the acquisition unit is further configured to: acquire a timing evaluation error value of a downlink reference signal;

- the processing unit is further configured to determine, based on terminal location information and satellite location information corresponding to a service cell, a timing advance evaluation error value; determine, based on the timing evaluation error value of the downlink reference signal and the timing advance evaluation error value, the timing limit threshold range.

According to a third aspect of the embodiments of the present disclosure, an apparatus for uplink timing adjustment is provided and includes:

- a processor; a memory for storing executable instructions of the processor;
- where the processor is configured to execute the method for uplink timing adjustment according to the embodiment of first aspect or any one of embodiment of the first aspect.

According to a fourth aspect of the embodiments of the present disclosure, a non-transitory storage medium is provided, the non-transitory storage medium has instructions stored thereon, when the instructions in the non-transitory storage medium are executed by a processor of a terminal, enables the terminal to perform the method for uplink timing adjustments according to the embodiment of first aspect or any one of embodiment of the first aspect.

The technical solution provided by the embodiments of the present disclosure may include the following beneficial effects: the terminal adjusts the uplink timing to be within the timing limit threshold range based on the timing difference between the first downlink timing corresponding to the first moment and the second downlink timing corresponding to the second moment. Compared to adjusting the uplink timing to be within the timing limit threshold range according to a single downlink timing, the terminal may adjust the uplink timing timely when the uplink timing changes significantly at different moments, so as to avoid affecting the transceiver performance of the terminal and avoid the interference to the uplink transmission of another terminal.

It should be further understood that in the present disclosure, "plurality" refers to two or more, and other quantifiers are similar. "And/or", which describes the association relationship of the associated objects, means that there may be three kinds of relationships, for example, A and/or B, which may mean that A exists alone, A and B exist at the same time, and B exists alone. The character "/" generally indicates that the associated objects are an "or" relationship. The singular forms "a," "the," and "the" are intended to include the plural forms as well, unless the context clearly dictates otherwise.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure.

It is further to be understood that, although the operations in the embodiments of the present disclosure are described in a specific order in the drawings, it should not be construed as requiring that the operations be performed in the specific order shown or the serial order, or requiring Perform all operations shown to obtain the desired result. In certain circumstances, multitasking and parallel processing may be advantageous Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings and that various modifications and changes may be made without departing from the scope thereof. It is intended that the scope of the present disclosure only be limited by the appended claims.

What is claimed is:

1. A method for uplink timing adjustment, performed by a terminal, comprising:

acquiring downlink timing information, wherein the downlink timing information comprises a first downlink timing corresponding to a first moment of the terminal and a second downlink timing corresponding to a second moment of the terminal; and adjusting, based on a timing difference between the second downlink timing and the first downlink timing, an uplink timing to be within a timing limit threshold range, wherein adjusting, based on the timing difference between the second downlink timing and the first downlink timing, the uplink timing to be within the timing limit threshold range comprises:

adjusting, in response to the timing difference between the second downlink timing and the first downlink timing being greater than a timing threshold value, the uplink timing to be within the timing limit threshold range by adopting a one shot adjustment manner, wherein the timing threshold value is greater than a maximum timing limit threshold of the timing limit threshold range.

2. The method for uplink timing adjustment according to claim 1, wherein the adjusting, based on the timing difference between the second downlink timing and the first downlink timing, the uplink timing to be within the timing limit threshold range comprises:

adjusting, in response to the timing difference between the second downlink timing and the first downlink timing being greater than the maximum timing limit threshold and less than the timing threshold value, the uplink timing to be within the timing limit threshold range by adopting a gradual adjustment manner.

3. The method for uplink timing adjustment according to claim 2, wherein the adjusting the uplink timing to be within the timing limit threshold range by adopting the gradual adjustment manner comprises:

receiving satellite type indication information;

determining, based on the satellite type indication information, a round-trip time delay variation, and determining, based on the round-trip time delay variation, a maximum amount of timing change, a minimum adjustment rate, and a maximum adjustment rate for at least one adjustment in the gradual adjustment manner; and gradually adjusting, based on the maximum amount of timing change, the minimum adjustment rate, and the maximum adjustment rate for at least one adjustment, the uplink timing to be within the timing limit threshold range.

4. The method for uplink timing adjustment according to claim 1, further comprising:

acquiring a timing evaluation error value of a downlink reference signal;

determining, based on terminal location information and satellite location information corresponding to a service cell, a timing advance evaluation error value; and determining, based on the timing evaluation error value of the downlink reference signal and the timing advance evaluation error value, the timing limit threshold range.

5. An apparatus for uplink timing adjustment, comprising:

a processor;

a memory for storing executable instructions of the processor;

wherein the processor is configured to perform acts comprising:

acquiring downlink timing information, wherein the downlink timing information comprises a first downlink timing corresponding to a first moment of the terminal and a second downlink timing corresponding to a second moment of the terminal; and adjusting, based on a timing difference between the second downlink timing and the first downlink timing, an uplink timing to be within a timing limit threshold range, wherein the processor is further configured to:

adjust, in response to the timing difference between the second downlink timing and the first downlink timing being greater than a timing threshold value, the uplink timing to be within the timing limit threshold range by adopting a one shot adjustment manner, wherein the timing threshold value is greater than a maximum timing limit threshold of the timing limit threshold range.

6. The apparatus for uplink timing adjustment according to claim 5, wherein the processor is further configured to:

adjust, in response to the timing difference between the second downlink timing and the first downlink timing being greater than the maximum timing limit threshold and less than the timing threshold value, the uplink timing to be within the timing limit threshold range by adopting a gradual adjustment manner.

7. The apparatus for uplink timing adjustment according to claim 6, wherein the processor is further configured to perform acts comprising:

receiving satellite type indication information;

determining, based on the satellite type indication information, a round-trip time delay variation, and determine, based on the round-trip time delay variation, a maximum amount of timing change, a minimum adjustment rate, and a maximum adjustment rate for at least one adjustment in the gradual adjustment manner; and gradually adjusting, based on the maximum amount of timing change, the minimum adjustment rate, and the maximum adjustment rate for at least one adjustment, the uplink timing to be within the timing limit threshold range.

8. The apparatus for uplink timing adjustment according to claim 5, wherein the processor is further configured to perform acts comprising:

acquiring a timing evaluation error value of a downlink reference signal;

determining, based on terminal location information and satellite location information corresponding to a service cell, a timing advance evaluation error value; and determining, based on the timing evaluation error value of the downlink reference signal and the timing advance evaluation error value, the timing limit threshold range.

9. A non-transitory storage medium having instructions stored thereon, when the instructions in the non-transitory storage medium are executed by a processor of a terminal, enables the terminal to perform acts comprising:

acquiring downlink timing information, wherein the downlink timing information comprises a first downlink timing corresponding to a first moment of the terminal and a second downlink timing corresponding to a second moment of the terminal; and adjusting, based on a timing difference between the second downlink timing and the first downlink timing, an uplink timing to be within a timing limit threshold range, wherein adjusting, based on the timing difference between the second downlink timing and the first downlink timing, the uplink timing to be within the timing limit threshold range comprises:

adjusting, in response to the timing difference between the second downlink timing and the first downlink timing being greater than a timing threshold value, the uplink timing to be within the timing limit threshold range by adopting a one shot adjustment manner, wherein the timing threshold value is greater than a maximum timing limit threshold of the timing limit threshold range.

10. The non-transitory storage medium according to claim 9, wherein the adjusting, based on the timing difference between the second downlink timing and the first downlink timing, the uplink timing to be within the timing limit threshold range comprises:

adjusting, in response to the timing difference between the second downlink timing and the first downlink timing being greater than the maximum timing limit threshold and less than the timing threshold value, the uplink timing to be within the timing limit threshold range by adopting a gradual adjustment manner.

11. The non-transitory storage medium according to claim 10, wherein the adjusting the uplink timing to be within the timing limit threshold range by adopting the gradual adjustment manner comprises:

receiving satellite type indication information;

determining, based on the satellite type indication information, a round-trip time delay variation, and determining, based on the round-trip time delay variation, a maximum amount of timing change, a minimum adjustment rate, and a maximum adjustment rate for at least one adjustment in the gradual adjustment manner; and gradually adjusting, based on the maximum amount of timing change, the minimum adjustment rate, and the maximum adjustment rate for at least one adjustment, the uplink timing to be within the timing limit threshold range.

12. The non-transitory storage medium according to claim 9, wherein when the instructions in the non-transitory storage medium are executed by the processor of the terminal, further enables the terminal to perform acts comprising:

acquiring a timing evaluation error value of a downlink reference signal;

determining, based on terminal location information and satellite location information corresponding to a service cell, a timing advance evaluation error value; and determining, based on the timing evaluation error value of the downlink reference signal and the timing advance evaluation error value, the timing limit threshold range.

* * * * *